(12) United States Patent
Kono et al.

(10) Patent No.: US 6,633,279 B1
(45) Date of Patent: Oct. 14, 2003

(54) LIQUID CRYSTAL DISPLAY DEVICE AND RESISTOR TYPE TOUCH PANEL

(75) Inventors: Masao Kono, Mutsuzawa (JP); Shinsaku Chiba, Mobara (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 219 days.

(21) Appl. No.: 09/611,369

(22) Filed: Jul. 6, 2000

(30) Foreign Application Priority Data

Jul. 12, 1999 (JP) ............................................. 11-197001

(51) Int. Cl.⁷ ................................................. G09G 5/08
(52) U.S. Cl. ........................................ 345/173; 345/174
(58) Field of Search ................................ 345/173, 174; 178/18.01, 18.03, 18.05

(56) References Cited

U.S. PATENT DOCUMENTS 4,990,725 A * 2/1991 Mizzi ...................... 178/18.05
5,159,159 A * 10/1992 Asher ...................... 178/18.05
5,818,430 A * 10/1998 Heiser ........................ 345/174
5,844,175 A * 12/1998 Nakanishi et al. ........ 178/18.03

FOREIGN PATENT DOCUMENTS

| JP | 6-139005 | 5/1994 |
|----|----------|--------|
| JP | 10-91350 | 4/1998 |

* cited by examiner

*Primary Examiner*—Steven Saras
*Assistant Examiner*—William C. Spencer
(74) *Attorney, Agent, or Firm*—Antonelli, Terry, Stout & Kraus, LLP

(57) ABSTRACT

A touch panel including an upper substrate (4A) consisting of a soft film having an upper resistor film (51) and a lower substrate of a hard plate having a lower resistor film, which are bonded together to face each other. The touch panel provides a detection output representing the position of contact between the upper resistor film (51) and the lower resistor film as two-dimensional coordinate values. Either the upper resistor film (51) or the lower resistor film or both are of a comb shape having a plurality of resistive lines with a common connector (41) at one end.

16 Claims, 7 Drawing Sheets

LIQUID CRYSTAL DISPLAY DEVICE AND RESISTOR TYPE TOUCH PANEL

BACKGROUND OF THE INVENTION

The present invention relates to a touch panel that detects the coordinates of an input point from a change in resistance due to a pressing force applied to the input point, and a liquid crystal display device including such a touch panel.

Liquid crystal-display devices used as display means for personal computers and monitors of other apparatuses produce a display in the following manner. An image generated on a liquid crystal panel is illuminated by light, and the light carrying the image is transmitted or reflected toward the display plane so as to be visible to a viewer.

More specifically, this type of liquid crystal display device uses a liquid crystal panel including a pair of substrates, each having pixel selection electrodes and the like mounted thereon. The substrates are bonded together with a liquid crystal layer sandwiched therebetween. An image is generated by changing the orientation state of the liquid crystal molecules in a selected pixel region. The generated image is not intrinsically visible. Therefore, the liquid crystal panel is illuminated by an external light so that the transmitted or reflected tight carrying the image is observed by a viewer.

In recent years, information terminals having touch panels have been broadly used, where the above type of liquid crystal display device is used as a display means and a touch panel is formed on the display screen for allowing various types of information to be input via the display screen.

Touch panels come in various types depending on the principle of operation thereof. Among them the most popular is a type that detects the coordinates of an input point from changes in the amount of resistance, called an analog resistor type.

The analog resistor type touch panel includes an input-side substrate made of a transparent soft film and a substrate made of a transparent hard plate, preferably a glass plate. Resistor films are formed on the opposing surfaces of the two transparent substrates. The two resistor films come into contact with each other by application of an external pressing force to a point on the input-side substrate. Two-dimensional coordinate values are detected from resistance values between the resistor films and output terminals.

Figure 10:
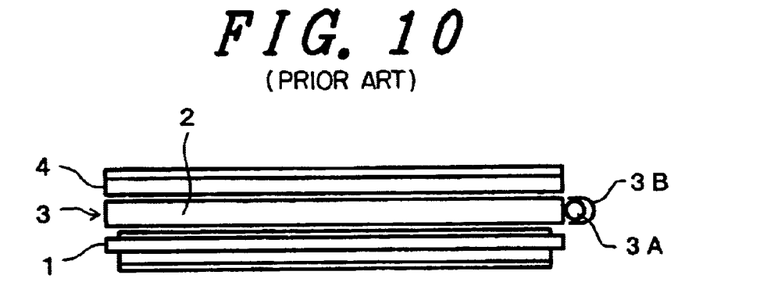
FIG. 10 is a schematic view illustrating a touch panel equipped liquid crystal display device.

FIG. 10 is a schematic illustration of the construction of a touch panel equipped liquid crystal display device, where a touch panel 4 is formed on a liquid crystal panel 1. In the illustrated liquid crystal display device, a light guide plate 2 constituting an auxiliary light source device 3 is provided between the liquid crystal panel 1 and the touch panel 4. A construction excluding the auxiliary light source device 3 has also been commercialized. The auxiliary light source device 3 includes a lamp 3A and a lamp reflection sheet 3B.

Figure 11:
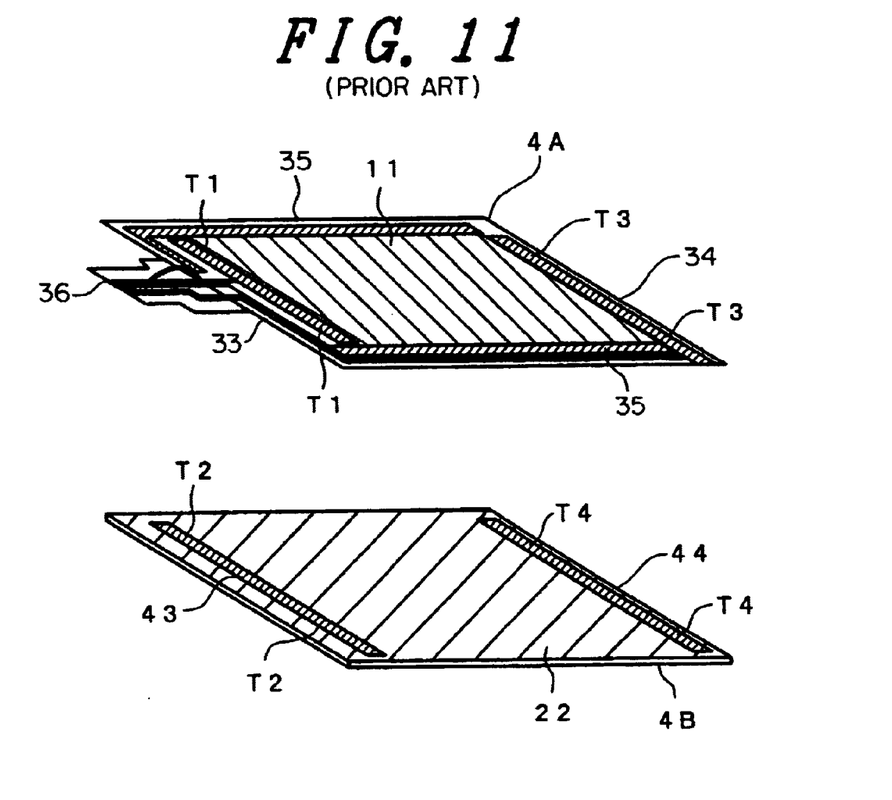
FIG. 11 is an exploded perspective view illustrating a conventional analog resistor type touch panel.

FIG. 11 is an exploded perspective view illustrating the construction of a conventional analog resistor type touch panel. The touch panel includes two transparent substrates. An upper substrate 4A is a soft film preferably made of polyethylene terephthatate (PET). A resistor film 11 preferably made of indium tin oxide (ITO) is formed on the entire inner surface of the upper substrate 4A. A lower substrate 4B is a hard plate preferably made of glass. A resistor film 22 preferably made of ITO is formed on the entire inner surface of the tower substrate 4B.

Interconnections 35 are formed on two opposing sides of the resistor film 11 of the upper substrate 4A along the edges thereof, and are electrically connected with the resistor film 11. The interconnections 35 have respective terminals at an interface 36 for communication with an external circuit. Connectors 33 and 34 for connection with the lower substrate are formed on the other two opposing sides of the resistor film 11 along the edges thereof, and are electrically isolated from the resistor film 11. The connectors 33 and 34 have respective terminals at the interface 36.

Connectors 43 and 44 for connection with the upper substrate are formed at positions of the resistor film 22 of the lower substrate 4B corresponding to the connectors 33 and 34. Once the upper and lower substrates 4A and 4B are bonded together, connection points $T_1$ and $T_3$ of the connectors 33 and 34 are electrically connected with connection points $T_2$ and $T_4$ of the connectors 43 and 44, respectively, via a conductive material, preferably silver paste. The connectors 33, 34, 43, and 44 are preferably made of the same material as the resistor films in consideration of the ease of the fabrication process. It is needless to mention that the connectors may be made of a material different from that of the resistor films. Thus, the resistor films 11 and 22 formed on the upper and lower substrates constitute a two-dimensional coordinate system, and the coordinates (x, y) (x: x-coordinate value, y: y-coordinate value) of a pressing point (input point) are detected with an external circuit.

The above conventional touch panel has the following problems. Since the resistor films 11 and 22 are solidly formed on the entire surfaces of the upper and lower substrates, the resistance values for detecting the position of the information input point are two-dimensional parameters for the solid resistor films extending between the connectors 33 and 34 and the connectors 43 and 44. Such parameters vary depending on the position of the input point on the resistor films, thereby lowering the linearity.

As a result, the level of detection of the input point becomes degraded, which may cause an input detection error or a deviation (calibration error) between the input point and the display position on a liquid crystal panel mounted on the back of the touch panel. An external circuit (CPU) performs the function of correcting the position. Nevertheless, a detection failure (input failure) is likely to arise, putting this error beyond the ability of function to correct. This causes a lowering in reliability.

Another problem is as follows. The connectors with the opposing substrate are formed on the periphery of one of the substrates (upper substrate in the construction of FIG. 11). This reduces the area of the effective input region and thus makes it difficult to realize so-called narrow framing. In addition, moisture may enter the inside between the substrates from the bonded edges, causing deterioration in the electrical characteristics of the resistor films and the connectors and thereby causing a variation in resistance value. This makes resistance management difficult.

An object of the present invention is to provide a highly reliable touch panel which is free from the occurrence of an input error and input failure, and a liquid crystal display device including such a touch panel.

SUMMARY OF THE INVENTION

The touch panel of the present invention is constructed as follows. At least one of the resistor films of the upper and lower substrates has a comb shape composed of a plurality of resistive lines and a common connector. The coordinate values of the input point are detected from a one-dimensional resistance value.

Using such a touch panel, the liquid crystal display device of the present invention permits highly reliable detection of a screen input.

Typical constructions according to the present invention are summarized as follows.

(1) A touch panel of the present invention includes an upper substrate in the form of a soft film having an upper resistor film and a lower substrate in the form of a hard plate having a lower resistor film, the upper substrate and the lower substrate being bonded together so as to face each other, the touch panel providing a detection output representing a contact position between the upper resistor film and the lower resistor film as two-dimensional coordinate values,     wherein both the upper resistor film and the lower resistor film are of a comb shape having a plurality of resistive lines with a common connector at one end, and the resistive lines of the upper resistor film and the resistive lines of the lower resistor film extend so as to intersect each other.

(2) In the construction (1), a lower resistor film connector or an upper resistor film connector is formed on the upper substrate or the lower substrate for electrically connecting with the corresponding common connector of the other substrate.

With the above constructions, information on an input point can be uniquely detected from the x-coordinate value and the y-coordinate value on the touch panel. In addition, the resistance value of the resistor film of each substrate can be managed via the common connector of the substrate. This facilitates correction of a change in linearity and prevents the occurrence of an input error and a detection failure.

(3) Another touch panel of the present invention includes an upper substrate in the form of a soft film having an upper resistor film and a lower substrate in the form of a hard plate having a lower resistor film, the upper substrate and the lower substrate being bonded together so as to face each other, the touch panel providing a detection output representing a contact position between the upper resistor film and the lower resistor film as two-dimensional coordinate values,     wherein either the upper resistor film or the lower resistor film is-of a comb shape having a plurality of resistive lines with a common connector at one end, and the other resistor film is formed on the inner surface of one of the upper and lower substrate and at least on an entire information input area.

(4) In the construction (3), a resistor film connector is formed on the substrate which the comb shape resistor film is formed for electrically connecting with the resistor film of the other substrate.

With the constructions of (3) and (4) above, information on an input point can be uniquely determined from just one of the coordinate values, x or y, on the touch panel. In addition, the resistance value of the resistor film of one substrate can be managed via the common connector of the substrate. This facilitates correction of a change in linearity and prevents the occurrence of an input error and detection failure as in the constructions of (1) and (2) above.

In the constructions (1) to (4), the resistance value of the comb shape resistor film can be managed via a common connector. This allows for precise and reliable management of the resistance value over the entire resistor film. Moreover, by coating the common connector with a protection film made of an insulating material, deterioration in resistance characteristics due to the entry of moisture is minimized.

(5) A liquid crystal display device of the present invention includes: a liquid crystal panel including a liquid crystal layer sandwiched between a pair of substrates; and a touch panel formed on the display plane side of the liquid crystal panel,     the touch panel including an upper substrate consisting of a soft film having an upper resistor film, and a tower substrate consisting of a hard plate having a lower resistor film, the upper substrate and the lower substrate being bonded together so as to face each other, the touch panel providing a detection output representing a contact position between the upper resistor film and the lower resistor film as two-dimensional coordinate values,     wherein both the upper resistor film and the lower resistor film are of a comb shape having a plurality of resistive lines with a common connector at one end, and the resistive lines of the upper resistor film and the resistive lines of the lower resistor film extend so as to intersect each other.

With the above construction, information on an input point can be uniquely detected from the x-coordinate value and the y-coordinate value on the touch panel. In addition, the resistance value of the resistor film of each substrate can be managed via the common connector of the substrate. This facilitates correction of a change in linearity and prevents the occurrence of an input error and detection failure. The resultant liquid crystal display device exhibits improved reliability in screen input.

(6) In the construction (5), a resistor film connector is formed on either the upper substrate or the lower substrate for electrically connecting with the common connector of the other substrate.

(7) Another liquid crystal display device of the present invention includes: a liquid crystal panel including a liquid crystal layer sandwiched between a pair of substrates; and a touch panel formed on a display plane side of the liquid crystal panel,     the touch panel including an upper substrate consisting of a soft film having an upper resistor film and a lower substrate consisting of a hard plate having a lower resistor film, the upper substrate and the lower substrate being bonded together so as to face each other, the touch panel providing a detection output representing a contact position between the upper resistor film and the lower resistor film as two-dimensional coordinate values,     wherein either the upper resistor film and the lower resistor film is of a comb shape having a plurality of resistive lines with a common connector at one end, and the other resistor film covers the resistor film of comb shape.

(8) In the construction (6), a resistor film connector is formed on the substrate on which the comb shape resistor film is formed for electrically connecting with the resistor film of the other substrate.

(9) In the constructions (5), (6), (7), and (8), an auxiliary illuminator is interposed between the liquid crystal panel and the touch panel.

(10) In the constructions (5), (6), (7), and (8), an auxiliary illuminator is placed on the back of the liquid crystal panel.

(11) A protection film is formed to coat the common connector of the touch panel of the constructions (1) through (4) and of the touch panel incorporated in the liquid crystal display device of the constructions (5) through (10).

The protection film may be made of a known insulating material or adhesive material, such as an epoxy resin or a silicone resin. The protection of the common connector with such a protection film minimizes changes in resistance at the common connector. Therefore, by managing the resistance value of the comb shape resistor film in the input region via the common connector, resistance value management is facilitated and ensured. As a result, a highly reliable touch panel and a liquid crystal display device including such a touch panel are obtained.

The liquid crystal panel used in the liquid crystal display device of the present invention may be of a simple matrix type, an active matrix type, or any other known type. It should also be noted that the present invention is applicable, not only to a reflection type, but also to a transmission type liquid crystal display device.

The present invention is not limited to the constructions described above, but many modifications and variations may be made without departing from the technical principles of the present invention.

BRIEF DESCRIPTION OF THE DRAWINGS

FIG. 1b is a cross-sectional view of Part A of FIG. 1a.

FIG. 2b is a cross-sectional view of Part B of FIG. 2a.

DESCRIPTION OF THE PREFERRED EMBODIMENTS

Hereinafter, the present invention will be described by way of example with reference to the accompanying drawings.

Figure 1A:
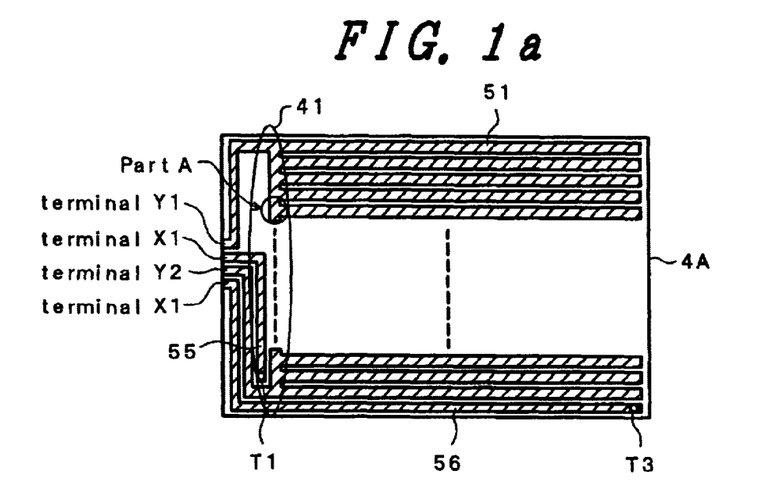
FIG. 1a is a plan view schematically illustrating an upper substrate in the first example of the touch panel of the present invention.
Figure 1B:
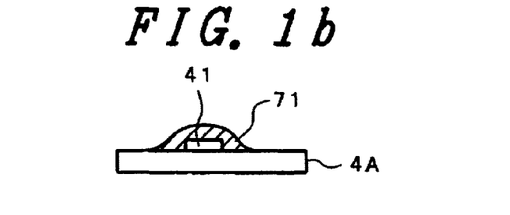

FIGS. 1a and 1b schematically illustrate the first example of the touch panel of the present invention: FIG. 1a is a plan view of the inner surface of an upper substrate 4A of the touch panel; and FIG. 1b is an enlarged cross-sectional view of Part A of FIG. 1a.

Figure 2A:
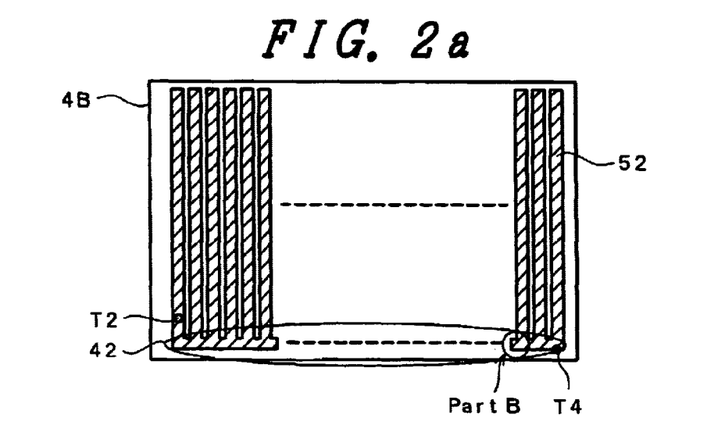
FIG. 2a is a plan view schematically illustrating a lower substrate in the first example of the touch panel of the present invention.
Figure 2B:
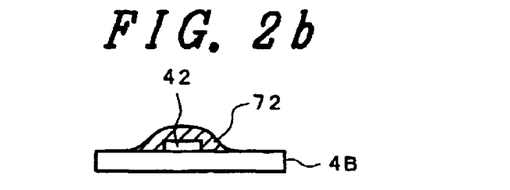

FIGS. 2a and 2b also schematically illustrate the first example of the touch panel of the present invention: FIG. 2a is a plan view of the inner surface of a lower substrate 4B of the touch panel; and FIG. 2b is an enlarged cross-sectional view of Part B of FIG. 2a.

Referring to FIG. 1a, the upper substrate 4A is made of a PET film. An upper common connector 41 is formed on one edge of the inner surface of the upper substrate 4A. A comb shape resistor film 51 composed of a plurality of resistive lines spreads from the upper common connector 41 toward the other edge of the inner surface. The upper common connector 41 and the comb shape resistor film 51 are made of ITO.

Both ends of the upper common connector 41 extend to form terminals Y1 and Y2. A first counter electrode interconnection 55 and a second counter electrode interconnection 56 are also formed on the inner surface of the upper substrate 4A. The first counter electrode interconnection 55 is formed near the upper common connector 41. The second counter electrode interconnection 56 is formed outside the comb shape resistor film 51 (on the bottom side in this figure) in parallel with the resistive lines of the resistor film 51. Respective ends of the first and second counter electrode interconnections 55 and 56 extend to form terminals X1 and X2, respectively. The first and second counter electrode interconnections 55 and 56 are formed of ITO, the same as the comb shape resistor film 51 and the common connector 41. The terminals Y1, Y2, X1, and X2 constitute an interface section for communication with an external circuit.

As shown in FIG. 1b, the upper common connector 41 is coated with a protection film 71 made of an epoxy resin. With the protection film 71, the upper common connector 41 is protected from the intrusion of moisture externally and thereby deterioration of the resistance characteristics is prevented.

Referring to FIG. 2a, the lower substrate 4B is made of glass. A lower common connector 42 is formed on one end of the inner surface of the lower substrate 4B. A comb shape resistor film 52 composed of a plurality of resistive lines spreads from the lower common connector 42 toward the other end of the inner surface.

As shown in FIG. 2b, the lower common connector 42 is coated with a protection film 72 made of an epoxy resin. With the protection film 72, the lower common connector 42 is protected from the intrusion of moisture externally and thereby deterioration in the resistance characteristics is prevented.

The upper substrate 4A shown in FIG. 1a and the lower substrate 4B shown in FIG. 2a are placed so that the inner surfaces thereof face each other, and they are bonded together so that the resistive lines of the comb shape resistor films 51 and 52 intersect each other (at right angles, in this example). At the time of bonding, points $T_1$ and $T_3$ of the upper substrate 4A are electrically connected with points $T_2$ and $T_4$ of the lower substrate 4B via silver paste. As a result, the terminals Y1 and Y2 and terminals X1 and X2 are bridge-connected with the upper common connector 41 of the upper substrate 4A and the lower common connector 42 of the lower substrate 4B, respectively, to serve as detection terminals. Once the touch panel is pressed, the coordinates (x, y) of a touch point are detected by an external circuit based on the resistance values corresponding to the distances of the point of contact between the upper comb shape resistor film 51 and the lower comb shape resistor film 52 from the respective common connectors.

Figure 3:
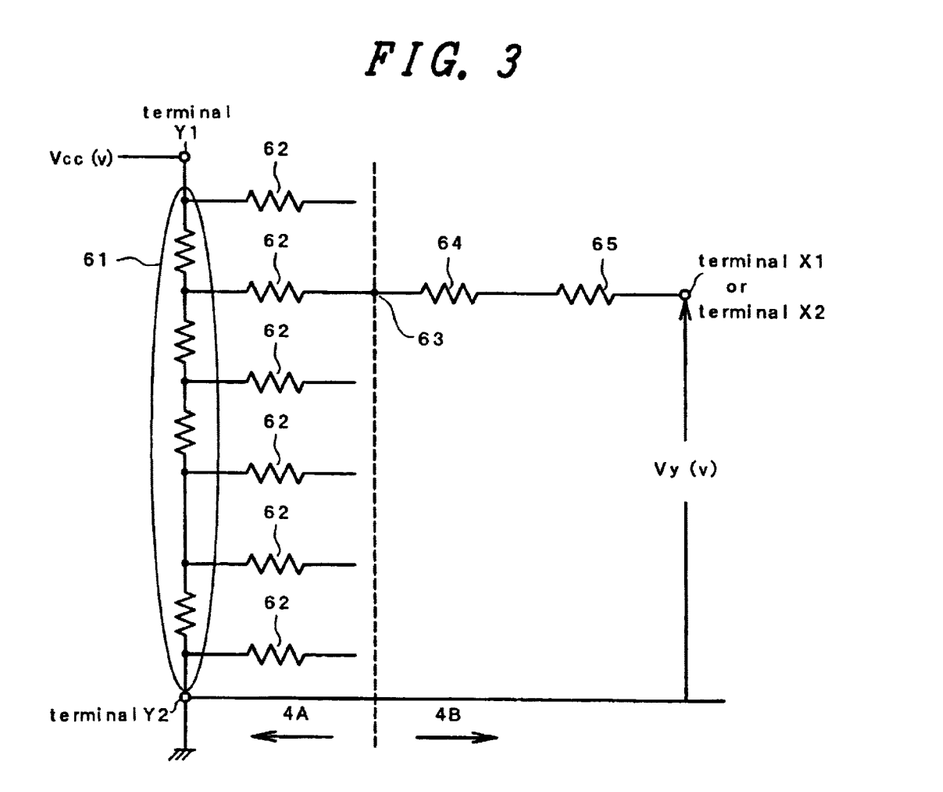
FIG. 3 is an equivalent circuit diagram used to describe the principle for detecting the coordinates of an input point in the first example of the present invention.

FIG. 3 is an equivalent circuit diagram. Referring to FIG. 3, the principle for detecting the coordinates of an input point in the first example of the present invention will be described. In FIG. 3, the reference numeral 61 denotes a series of resistances of the upper common connector 41, 62 denotes resistances of the upper comb shape resistor film 51, 63 denotes a touch point (input point), 64 denotes the resistance of the lower comb shape resistor film 52, and 65 denotes the resistance of the lower common connector 42.

The terminals Y1 and Y2 are drawn from both ends of the series of resistances 61 of the upper common connector 41. The terminal X1 or X2 is drawn from the resistance 65 of the lower common connector 42. A voltage Vcc(V) is applied to the terminal Y1 while the terminal Y2 is grounded. The voltage Vcc(V) is divided among the resistances 61 in series. The resistance-divided voltages of the voltage Vcc(V) can be detected at the resistances 62 of the upper comb shape resistor film 51.

When a point in the input region (the region having intersections between the resistive lines of the upper comb shape resistor film 51 and the lower comb shape resistor film 52; input plane) of the touch panel is pressed generating the touch point 63, a voltage Vy(V) is detected at the terminal X1 or X2 via the touch point 63 and the resistance 65 of the lower common connector 42.

The change in the detection voltage Vy(V) only depends on the series of resistances 61 of the upper common connector 41. This means that the linearity is secured by managing the resistance values only for the upper common connector 41 and the lower common connector 42. Since the upper common connector 41 and the lower connector 42 are coated with the protection films as described above, deterioration in resistance characteristics of these common connectors due to the intrusion of moisture is avoided, and thus the reliability is improved.

Figure 4:
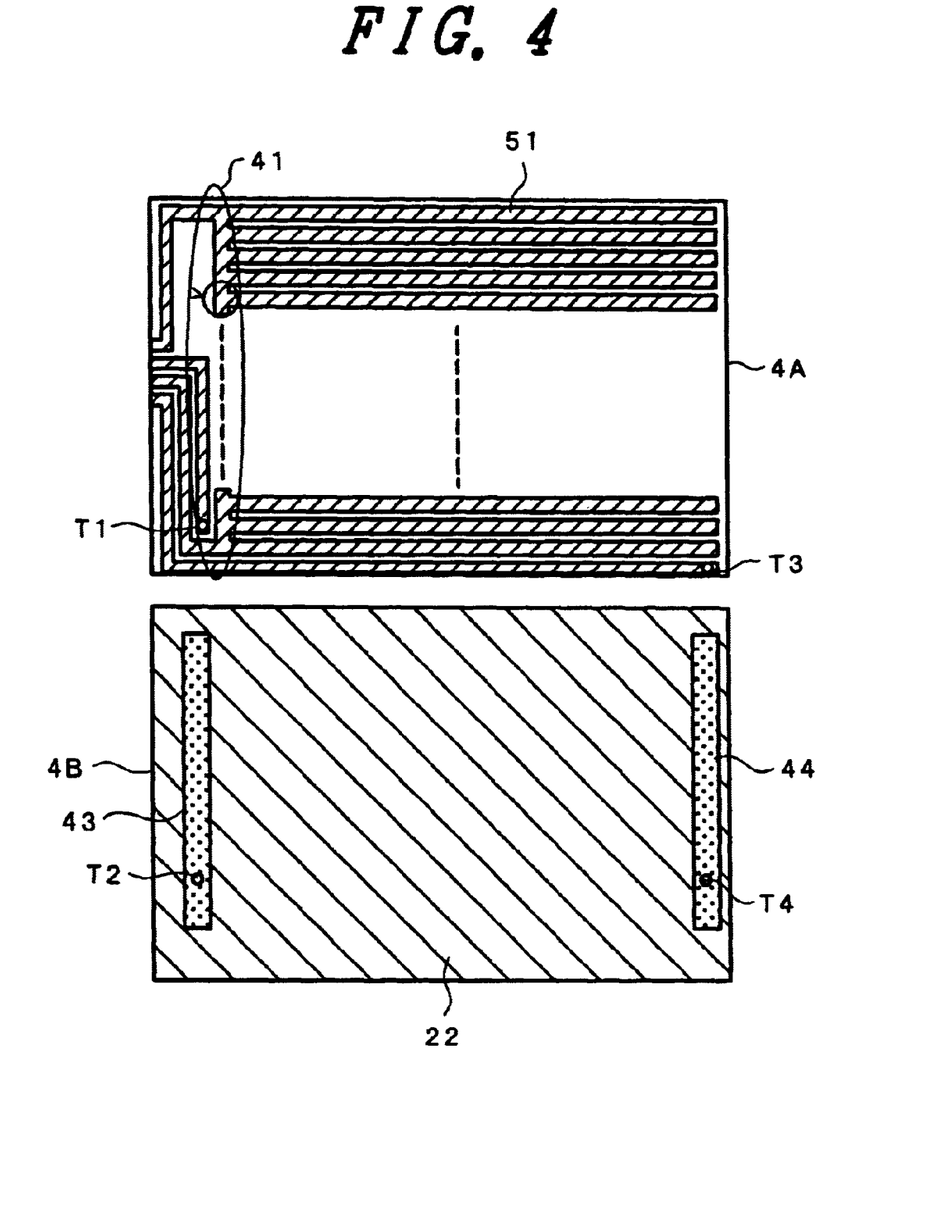
FIG. 4 is a structural diagram schematically illustrating an upper substrate and a lower substrate in the second example of the touch panel of the present invention.

FIG. 4 is a structural view schematically illustrating an upper substrate 4A and a lower substrate 4B in a second example of the touch panel of the present invention. In this example, the upper substrate 4A has substantially the same construction as that in the first example, while the lower substrate 4B has substantially the same construction as the conventional lower substrate described with reference to FIG. 11, i.e. is formed on the entire information input area.

In this example, a resistor film 22 formed on the lower substrate 4B has a comparatively stable resistance since the underlying lower substrate is a hard plate made of glass. The upper substrate 4A and the lower substrate 4B are placed so that the inner surfaces thereof face each other and are bonded together. At the bonding, points $T_1$ and $T_3$ of the upper substrate 4A are electrically connected with points $T_2$ and $T_4$ of the lower substrate 4B via silver paste.

As a result, as in the first example, once the touch panel is pressed, the coordinate values (x, y) of an input point are detected based on the resistance values corresponding to the distances of the point of contact between the upper comb shape resistor film 51 and the lower resistor film 22 from connectors on the upper substrate 4A.

Hereinafter, a liquid crystal display device, including any of the touch panels described above in accordance with the present invention, will be described. It should be noted that although a liquid crystal display device provided with an auxiliary illuminator is described in the following examples, the auxiliary illuminator may be omitted.

Figure 5:
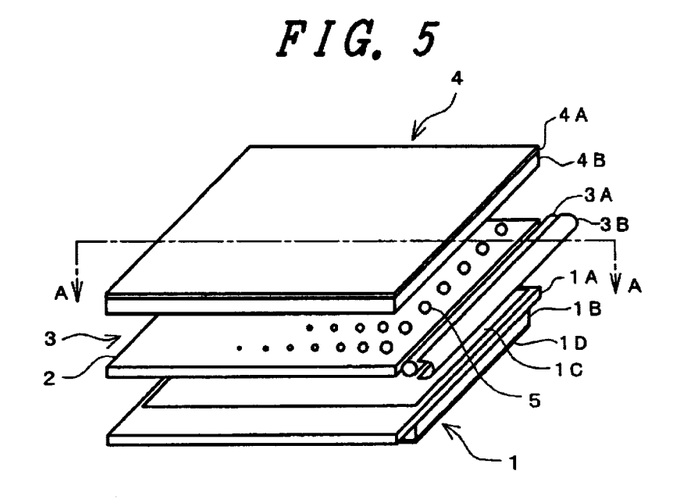
FIG. 5 is an exploded perspective view illustrating the first example of the liquid crystal display device of the present invention.

FIG. 5 is an exploded perspective view of the first example of the liquid crystal display device of the present invention. The liquid crystal display device includes a reflection type liquid crystal panel 1, a light guide plate 2 constituting an auxiliary light source device 3, and a touch panel 4.

The liquid crystal panel 1 includes an upper transparent substrate 1A, a lower transparent substrate 1B, a polarizing plate 1C, and a reflector 1D. In this example, a transparent plate is used as the lower substrate and the reflector is additionally provided on the back of the lower substrate. Alternatively, the inner surface of the lower substrate may be processed to have a reflection function. In this case, the reflector 1D is unnecessary.

The light guide plate 2 constituting the auxiliary light source device 3 is made of an acrylic plate or the like having a thickness of 1.5 mm. The auxiliary light source device 3 also includes a linear lamp 3A (a linear light source composed of a linear fluorescent tube or a light emitting diode; hereinafter referred to simply as a lamp) and a lamp reflection sheet 3B. The touch panel 4 includes a soft film sheet (upper substrate) 4A and a hard substrate (lower substrate) 4B made of glass or acrylic (glass plate in this example).

The liquid crystal display device of this example has a construction such that the auxiliary light source device 3 is formed on the liquid crystal panel 1 and the touch panel 4 is formed on the auxiliary light source device 3. The liquid crystal panel 1 is not limited to the reflection type as illustrated, but may be of a semi-transmission type.

Convex/concave or printed spots 5 in the shape of microprisms, slits, or dots (printed dots in this example) are formed on the top surface of the light guide plate 2, that is, the surface thereof facing the touch panel 4, for light diffusion. A cold-cathode fluorescent tube having a diameter of 2.0 mm is used as the lamp 3A of the auxiliary light source device 3.

Figure 6:
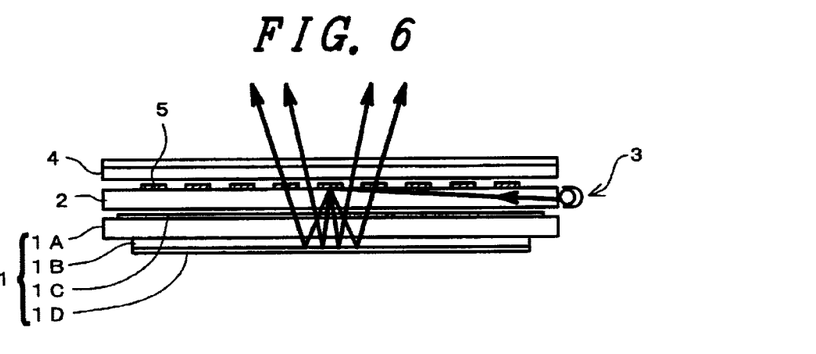
FIG. 6 is a cross-sectional view taken along line A—A of FIG. 5, used to describe the operation of an auxiliary illuminator in the first example of the liquid crystal display device of the present invention.

FIG. 6 is a cross-sectional view taken along line A—A of FIG. 5. The operation of the auxiliary light source device in the first example of the liquid crystal display device will be described with reference to FIG. 6. The printed dots 5 are formed on the surface of the light guide plate 2 constituting the auxiliary light source device 3 facing the touch panel 4. As shown by the arrows in FIG. 6, light from the lamp 3A is reflected toward the liquid crystal panel 1, and the light reflected from the liquid crystal panel 1 is transmitted through the touch panel 4 toward the display plane.

The above liquid crystal panel 1, the auxiliary light source device 3, and the touch panel 4 are put together preferably by bonding respective peripheries to one another via a double-sided adhesive tape. Other attaching means, such as a mechanical retaining frame or an adhesive, may be used.

The auxiliary light source device may be made to stay on; i.e., always be illuminated. However, in the case of applying the liquid crystal display device to a portable information apparatus such as a personal data assistant (PDA) or a notebook computer which requires power saving, the auxiliary light source device may be made to come on as required.

In this example, therefore, there is obtained a liquid crystal display device including a highly reliable touch panel which is free from the occurrence of input error and input failure.

Figure 7:
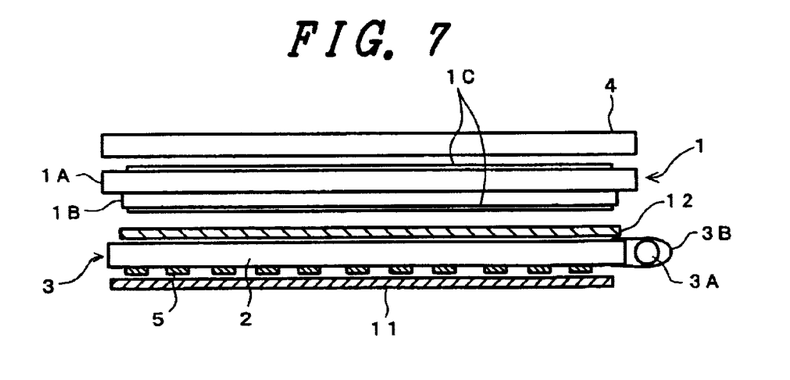
FIG. 7 is a schematic cross-sectional view illustrating the second example of the liquid crystal display device of the present invention.
Figures 8A, 8B, 8C, 8D:
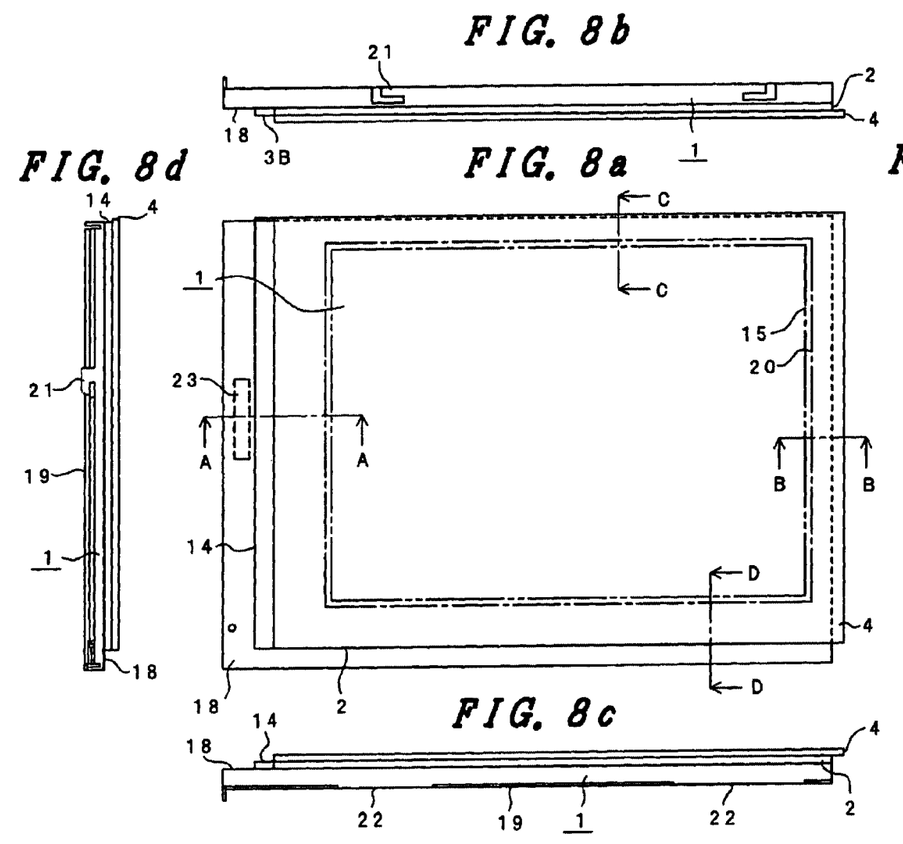
FIGS. 8a, 8b, 8c, 8d, and 8e are a front view, a top view, a bottom view, a left side view, and a right side view, respectively, of an actual construction of the liquid crystal display device of the present invention.
Figure 8E:
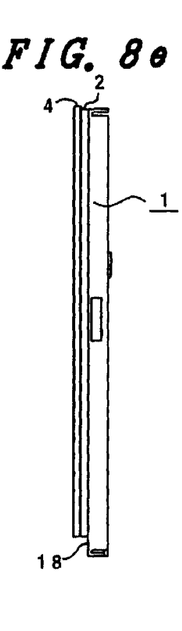

FIG. 7 is a schematic cross-sectional view illustrating the second example of the liquid crystal display device of the present invention. The liquid crystal display device of this example includes a transmission type liquid crystal panel 1 and an auxiliary light source device 3 called a backlight. The backlight 3 is placed on the back of the transmission type liquid crystal panel 1. Illumination light from the backlight 3 is transmitted through the liquid crystal panel 1 while being modulated with an image formed on the liquid crystal panel 1. The modulated light is output from the surface of the liquid crystal panel 1 thereby visualizing the image.

A touch panel 4 according to the present invention is formed on the display plane (screen) side of the liquid crystal panel 1 so that information can be input via the display plane of the liquid crystal panel 1.

More specifically, in the liquid crystal display device of this example, the liquid crystal panel 1 includes two transparent substrates 1A and 1B, a liquid crystal layer sandwiched between the two substrates, and polarizing plates 1C disposed on the front and back outer surfaces of the substrates. On the back of the liquid crystal panel 1, there is formed an auxiliary light source device 3 including a roughly rectangular transparent light guide plate 2, a lamp 3A placed along an end of the light guide plate 2, and a lamp reflection sheet 3B. Light from the lamp 3A propagates in the light guide plate 2, and on the path of the propagation, changes direction toward the liquid crystal panel 1 to illuminate the liquid crystal panel 1 from the back. Printed dots 5 or the like are formed on the opposite surface of the light guide plate 2 so as to ensure uniform brightness over the entire area of the liquid crystal panel.

A reflector 11 is placed on the back of the light guide plate 2 for total-reflection of the light from the light guide plate 2 output toward the back side thereof to return the light toward the liquid crystal panel 1.

A light diffusion film 12 or a light quantity distribution correction member such as a prism plate (not shown) is formed between the liquid crystal panel 1 and the auxiliary light source device or backlight 3. Thus, the transmission type liquid crystal display device is constructed.

FIGS. 8a through 8e are five-side views illustrating an actual construction of the liquid crystal display device of the present invention. In this construction, a light guide plate 2 constituting a front light is placed on a liquid crystal panel 1 (housed in a case composed of an upper case 18 and a lower case 19), and a touch panel 4 is placed on the light guide plate 2.

The display region of the liquid crystal display device is shown by the reference numeral 15, while the input region of the touch panel 4 is shown by the reference numeral 20.

The case houses the liquid crystal panel 1 and a driving circuit therein, and is closed by engaging claws 21 and hooks 22 formed on the upper case 18 with counterparts on the lower case 19. The front light includes a lamp 3A (covered with a lamp reflection sheet 3B) placed along an end of the light guide plate 2. The touch panel 4 is placed on the light guide plate 2. Signal cables for the touch panel 4 and power cables for the lamp 3B are omitted in these figures. The reference numeral 23 denotes an interface connector for communicating with a host computer.

Figure 9:
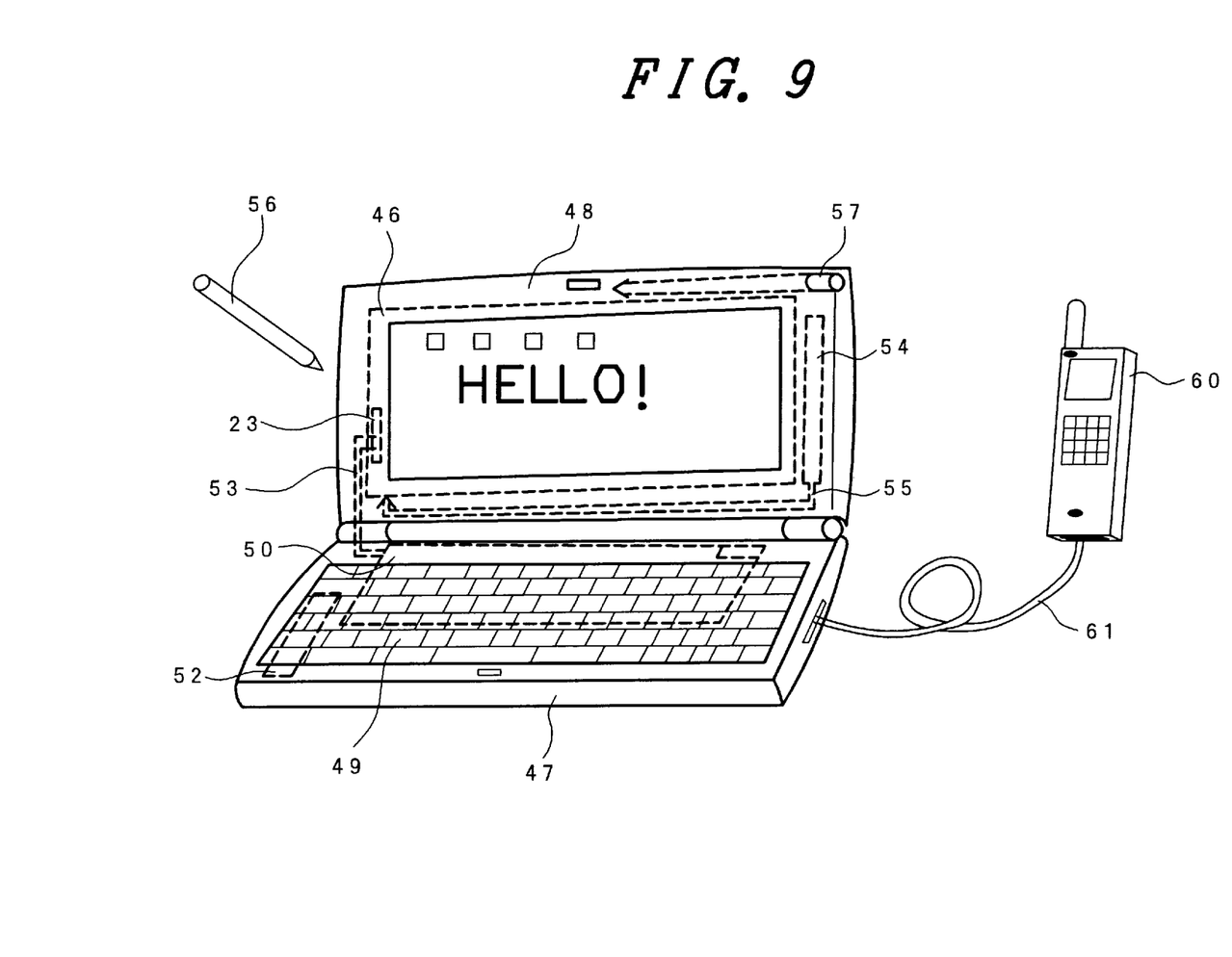
FIG. 9 is a perspective view illustrating a portable information terminal as an example of an electronic apparatus equipped with the liquid crystal display device of the present invention.

FIG. 9 is a perspective view of a portable information terminal representing an example of an electronic-apparatus equipped with the liquid crystal display device of the present invention. The portable information terminal (PDA) includes: a body section 47 having a host computer 50 and a battery 52 housed therein and a keyboard 49 formed on the surface; and a display section 48 having a liquid crystal display device 46 and an inverter 54 for a front light.

The body section 47 is equipped with a connector for a cellular phone 67 via a connecting cable 68 to permit remote communication.

The liquid crystal display device 46 of the display section 48 and the host computer 50 in the body section 47 are connected with each other via an interface cable 53.

A pen holder 57 is provided on the display section 48 for holding an input pen 66.

The liquid crystal display device incorporated in the information apparatus with the above construction allows for various operations including the following. In addition to information input by use of the keyboard 49, various types of information can be input by pressing or tracing the surface of the touch panel or writing a character and the like on the surface using the input pen 66. Also, it is possible to make a choice among options of information and processing functions displayed on the liquid crystal panel.

The portable information terminal (PDA) of the type described above is not limited to the illustrated one in shape and structure, but those having various shapes, structures, and functions can be implemented.

Thus, according to the present invention, a highly reliable touch panel free from occurrence of an input error and input failure, and a liquid crystal display device including such a touch panel can be provided.

What is claimed is:

1. A touch panel comprising an upper substrate of a soft film having an upper resistor film and a lower substrate of a hard plate having a lower resistor film, the upper substrate and the lower substrate being bonded together to face each other, the touch panel providing a detection output representing a position of contact between the upper resistor film and the lower resistor film as two-dimensional coordinate values, wherein both the upper resistor film and the lower resistor film are of a comb shape having a plurality of resistive lines with a common connector at one end, and the resistive lines of the upper resistor film and the resistive lines of the lower resistor film extend to intersect each other;

wherein a lower resistor film connector or an upper resistor film connector is formed on the upper substrate or the lower substrate for electrically connecting with the common connector of the other substrate; and wherein the common connector is coated with a protection film which protects the common connector from intrusion of moisture externally so that deterioration of resistance characteristics of the common connector is prevented.

2. A touch panel according to claim 1, wherein an electrical connection between the common connector and the upper resistor film connector or the lower resistor film connector of the other substrate has a shape of a point, and the common connector is covered with the protection film other than at the electrical connection point with the upper resistor film connector or the lower resistor film.

3. A touch panel comprising an upper substrate of a soft film having an upper resistor film and a lower substrate of a hard plate having a lower resistor film, the upper substrate and the lower substrate being bonded together to face each other, the touch panel providing a detection output representing a position of contact between the upper resistor film and the lower resistor film as two-dimensional coordinate values, wherein either the upper resistor film or the lower resistor film is of a comb shape having a plurality of resistive lines with a common connector at one end, and the other resistor film is formed on the inner surface of one of the upper and lower substrates and is formed on an entire information input area.

4. A touch panel according to claim 3, wherein a resistor film connector is formed on either the upper substrate or the lower substrate on which the comb shape resistor film is formed for electrically connecting with the resistor film of the other substrate.

5. A touch panel according to claim 4, wherein the common connector is coated with a protection film.

6. A touch panel according to claim 3, wherein the upper resistor film is of the comb shape, and the lower resistor film is formed on the entire information input area.

7. A touch panel according to claim 6, wherein the common connector is coated with a protection film.

8. A touch panel according to claim 3, wherein the common connector is coated with a protection film.

9. A liquid crystal display device comprising:

a liquid crystal panel including a liquid crystal layer sandwiched between a pair of substrates; and a touch panel formed on the display plane side of the liquid crystal panel, the touch panel including an upper substrate consisting of a soft film having an upper resistor film and a lower substrate consisting of a hard plate having a lower resistor film, the upper substrate and the lower substrate being bonded together to face each other, the touch panel providing a detection output representing a position of contact between the upper resistor film and the lower resistor film as two-dimensional coordinate values, wherein both the upper resistor film and the lower resistor film are of a comb shape having a plurality of resistive lines with a common connector at one end, and the resistive lines of the upper resistor film and the resistive lines of the lower resistor film extend to intersect each other;

wherein a lower resistor film connector or an upper resistor film connector is formed on the upper substrate or the lower substrate for electrically connecting with the common connector of the other substrate; and wherein the common connector is coated with a protection film which protects the common connector from intrusion of moisture externally so that deterioration of resistance characteristics of the common connector is prevented.

10. A liquid crystal display device according to claim 9, wherein an electrical connection between the common connector and the upper resistor film connector or the lower resistor film connector of the other substrate has a shape of a point, and the common connector is covered with the protection film other than at the electrical connection point with the upper resistor film connector or the lower resistor film.

11. A liquid crystal display device comprising:

a liquid crystal panel including a liquid crystal layer sandwiched between a pair of substrates; and a touch panel formed on the display plane side of the liquid crystal panel, the touch panel including an upper substrate of a soft film having an upper resistor film and a lower substrate of a hard plate having a lower resistor film, the upper substrate and the lower substrate being bonded together to face each other, the touch panel providing a detection output representing a position of contact between the upper resistor film and the lower resistor film as two-dimensional coordinate values, wherein either the upper resistor film or the lower resistor film is of a comb shape having a plurality of resistive lines with a common connector at one end, and the other resistor film is formed on the inner surface of one of the upper and lower substrates and is formed on an entire information input area.

12. A liquid crystal display device according to claim 11, wherein a resistor film connector is formed on either the upper substrate or the lower substrate on which the comb shape resistor film is formed for electrically connecting with the resistor film of the other substrate.

13. A liquid crystal display device according to claim 12, wherein the common connector is coated with a protection film.

14. A liquid crystal display device according to claim 11, wherein the upper resistor film is of the comb shape, and the lower resistor film is formed on the entire information input area.

15. A liquid crystal display device according to claim 14, wherein the common connector is coated with a protection film.

16. A liquid crystal display device according to claim 11, wherein the common connector is coated with a protection film.

* * * * *